United States Patent
Wang et al.

(10) Patent No.: US 10,997,967 B2
(45) Date of Patent: May 4, 2021

(54) METHODS AND SYSTEMS FOR COCKPIT SPEECH RECOGNITION ACOUSTIC MODEL TRAINING WITH MULTI-LEVEL CORPUS DATA AUGMENTATION

(71) Applicant: HONEYWELL INTERNATIONAL INC., Morris Plains, NJ (US)

(72) Inventors: Luning Wang, Beijing (CN); Wei Yang, Beijing (CN); Zhiyong Dai, Beijing (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 207 days.

(21) Appl. No.: 16/388,647

(22) Filed: Apr. 18, 2019

(65) Prior Publication Data
US 2020/0335084 A1 Oct. 22, 2020

(51) Int. Cl.
*G10L 15/06* (2013.01)
*G10L 21/0364* (2013.01)
*B64D 43/00* (2006.01)

(52) U.S. Cl.
CPC .......... *G10L 15/063* (2013.01); *B64D 43/00* (2013.01); *G10L 21/0364* (2013.01); *G10L 2015/0633* (2013.01); *G10L 2015/0635* (2013.01)

(58) Field of Classification Search
CPC . G10L 21/0208; G10L 21/0232; G10L 15/20; G10L 15/22; G10L 21/02;
(Continued)

(56) References Cited

U.S. PATENT DOCUMENTS 8,538,751 B2 * 9/2013 Nakadai .............. G10L 21/0272
704/233
9,640,194 B1 5/2017 Nemala et al.
(Continued)

FOREIGN PATENT DOCUMENTS

KR 20170107283 A 9/2017

OTHER PUBLICATIONS

Voice Activated Cockpit for General Aviation, Wesson et al, http://www.wesson.com/uploads/2/3/6/4/2364754/voice-activated_cockpit.pdf, May 24, 2006, p. 1-58 (Year: 2006).*
(Continued)

*Primary Examiner* — Linda Wong
(74) *Attorney, Agent, or Firm* — Lorenz & Kopf, LLP

(57) ABSTRACT

A method for initializing a device for performing acoustic speech recognition (ASR) using an ASR model, by a computer system including at least one processor and a system memory element. The method includes obtaining a plurality of voice data articulations of predetermined phrases, by the at least one processor via a user interface. The plurality of voice data articulations includes a first quantity of audio samples of actual articulated voice data, and each of the plurality of voice data articulations includes one of the audio samples including acoustic frequency components. The method further includes performing a plurality of augmentations to the plurality of voice data articulations of predetermined phrases, to generate a corpus audio data set that includes the first quantity of audio samples and a second quantity of audio samples including augmented versions of the first quantity of audio samples.

20 Claims, 6 Drawing Sheets

(58) Field of Classification Search
CPC ... G10L 15/26; G10L 21/003; G10L 21/0388;
G10L 2021/02087; G10L 25/18; G10L
25/30; G10L 15/02; G10L 15/063; G10L
15/24; G10L 19/0018; G10L 13/00; G10L
15/065; G10L 2015/025; G10L 21/0316;
G10L 21/034; G10L 25/03; G10L 25/90;
G10L 25/93; G10L 15/00; G10L 15/08;
G10L 15/1815; G10L 15/1822; G10L
15/28; G10L 17/26; G10L 19/00; G10L
19/028; G10L 2025/786; G10L 21/00;
G10L 21/0272; G10L 21/028; G10L
21/06; G10L 25/60; G10L 21/0364; G10L
2015/0633; G10L 2015/0635; H04R
3/005; H04R 2410/05; H04R 25/505;
H04R 2410/01; H04R 25/353; G06F
3/167; G06F 16/433; G06F 3/16; B64D
43/00
See application file for complete search history.

(56) References Cited

U.S. PATENT DOCUMENTS

| | | | |
|---|---|---|---|
| 10,013,973 B2 | 7/2018 | Doddipatla | |
| 2003/0182114 A1* | 9/2003 | Dupont | G10L 21/0208 |
| | | | 704/233 |
| 2008/0281593 A1* | 11/2008 | Deligne | G10L 15/063 |
| | | | 704/243 |
| 2010/0169093 A1* | 7/2010 | Washio | G10L 15/063 |
| | | | 704/243 |
| 2012/0010887 A1* | 1/2012 | Boregowda | G10L 15/22 |
| | | | 704/250 |
| 2017/0011738 A1* | 1/2017 | Senior | G10L 15/063 |
| 2017/0040016 A1 | 2/2017 | Cui et al. | |
| 2017/0148433 A1 | 5/2017 | Catanzaro et al. | |
| 2018/0366138 A1* | 12/2018 | Ramprashad | G10L 21/0208 |
| 2020/0251115 A1* | 8/2020 | Farinelli | G10L 17/22 |

OTHER PUBLICATIONS

Prisyach, Tatiana et al., "Data Augmentation for Training of Noise Robust Acoustic Models," 5th International Conference, Apr. 2016, downloaded from http://www.springer.com/978-3-319-52919-6 on Dec. 3, 2018.

* cited by examiner

METHODS AND SYSTEMS FOR COCKPIT SPEECH RECOGNITION ACOUSTIC MODEL TRAINING WITH MULTI-LEVEL CORPUS DATA AUGMENTATION

TECHNICAL FIELD

The present disclosure generally relates to acoustic speech recognitions methods and systems. More particularly, the present disclosure relates to methods and systems for cockpit speech recognitions acoustic model training with multi-level corpus data augmentation.

BACKGROUND

In modern aircraft, advances in sensor and information processing technologies have led to a significant increase in the amount of information available to a pilot. Although this generally enables the pilot to gain a better situational awareness at any given time, the pilot often is required to scan information from several sources in order to gain that situational awareness. In addition, with the increased complexity of modern aircraft, the pilot may be required to control more aircraft systems and sub-systems than were present in less technologically complex aircraft of the past.

During aircraft operations, a pilot is required to accurately determine and maintain continual awareness of various elements of the current aircraft status, such as speed, altitude, location, direction of flight, external atmospheric conditions, cabin conditions, fuel status, and rate of change of various parameters, among a host of other things. Furthermore, it is particularly important to ensure, during take-off and landing, that the aircraft is functioning normally within various parameter bounds, and that external conditions are favorable for the take-off or landing maneuvers. In general, however, given the number of parameters that a pilot needs to accurately determine and monitor during the various phases of aircraft operations, the pilot may have very limited time to make important decisions regarding control of the aircraft.

In addition, the pilot frequently may be required to remove a hand from the control instrumentation and to divert his or her attention from the task at hand to manipulate physical components of a user interface (e.g., keys, dials, buttons, levers, and so on) in order to alter the aircraft operations in light of the information associated with the monitored parameters. The monitoring and control of the aircraft may impose a considerable amount of strain on a pilot, at times.

One method/system that has been developed in recent years to assist the pilot in maintaining situational awareness and reducing the manipulation of physical components of the user interface is acoustic speech recognition (ASR). ASR methods/systems receive voice inputs from either the pilot or an air traffic controller and make appropriate changes to the aircraft systems that otherwise would have required a pilot input. For example, ASR methods/systems may be capable of receiving a voice input from an air traffic controller (sent via radio to the aircraft) indicative of a request for change in radio frequency, altitude, heading, speed, or some other aircraft operational parameter, which may be recognized and automatically input at the appropriate system of the aircraft, thereby relieving the pilot of this burden. In another scenario, ASR methods/systems may be capable of receiving a voice input from the pilot indicative of a command for change in radio frequency, altitude, heading, speed, or some other aircraft operational parameter, which may be recognized and automatically input at the appropriate system of the aircraft, thereby relieving the pilot of this burden.

One challenge in ASR technologies has been achieving an acceptable level of accuracy in speech recognition, so as to avoid incorrect inputs to the aircraft systems. In prior art ASR methods/systems, an acceptable level of accuracy in speech recognition has been based on model training by a large amount of "voice corpus" data. As used herein, the term "voice corpus" data refers to the "body" of voice recordings that is used to train the ASR system. In aviation industry applications, however, collecting and labelling voice corpus data is difficult due to the number of different speakers (any given aircraft is typically piloted by numerous different flight crews) and the ambient sound environment (engine and other sounds during flight may distort the voice corpus data).

Based on the foregoing, it would be desirable to provide aircraft cockpit acoustic speech recognition methods and systems that achieve a relatively high accuracy level with limited voice corpus data. Furthermore, other desirable features and characteristics of the disclosure will become apparent from the subsequent detailed description and the appended claims, taken in conjunction with the accompanying drawings, brief summary, technical field, and this background of the disclosure.

BRIEF SUMMARY

Generally disclosed herein are methods and systems for improved acoustic speech recognition. In accordance with one exemplary embodiment, disclosed herein is a method for initializing a device for performing acoustic speech recognition (ASR) using an ASR model, by a computer system including at least one processor and a system memory element. The method includes obtaining a plurality of voice data articulations of predetermined phrases, by the at least one processor via a user interface. The plurality of voice data articulations includes a first quantity of audio samples of actual articulated voice data, and each of the plurality of voice data articulations includes one of the audio samples including acoustic frequency components. The method further includes performing a plurality of augmentations to the plurality of voice data articulations of predetermined phrases, to generate a corpus audio data set that includes the first quantity of audio samples and a second quantity of audio samples including augmented versions of the first quantity of audio samples. Performing the plurality of augmentations includes performing a first level augmentation by processing each of the plurality of voice data articulations to enhance a first subset of the acoustic frequency components and to suppress a second subset of the acoustic frequency components, to generate transformed voice data articulations including a plurality of voice transformations. Performing the plurality of augmentations further includes performing a second level augmentation by processing the transformed voice data articulations. Performing the second level augmentation includes combining the transformed voice data articulations with noise-based audio data, to generate combined voice data articulations, by the at least one processor, and adjusting levels of the noise-based audio data for each of the combined voice data articulations to generate the corpus audio data set including various noise levels, by the at least one processor. Each audio sample of the corpus audio data set includes one of the plurality of voice transformations and one of the various noise levels. The method further includes training the ASR model to perform ASR, using the corpus audio data set, by the at least one processor.

In accordance with another exemplary embodiment, a computer system for performing acoustic speech recognition (ASR) using an ASR model includes a system memory element, a user interface, and at least one processor. The at least one processor is configured to obtain a plurality of voice data articulations of predetermined phrases via the user interface. The plurality of voice data articulations includes a first quantity of audio samples of actual articulated voice data, and each of the plurality of voice data articulations includes one of the audio samples including acoustic frequency components. The at least one processor is further configured to perform a plurality of augmentations to the plurality of voice data articulations of predetermined phrases, to generate a corpus audio data set that includes the first quantity of audio samples and a second quantity of audio samples including augmented versions of the first quantity of audio samples. The at least one processor performs the plurality of augmentations by performing a first level augmentation, which includes processing each of the plurality of voice data articulations to enhance a first subset of the acoustic frequency components and to suppress a second subset of the acoustic frequency components, to generate transformed voice data articulations including a plurality of voice transformations, and by performing a second level augmentation. The second level augmentation includes processing the transformed voice data articulations, by combining the transformed voice data articulations with noise-based audio data, to generate combined voice data articulations, and adjusting levels of the noise-based audio data for each of the combined voice data articulations to generate the corpus audio data set including various noise levels. Each audio sample of the corpus audio data set includes one of the plurality of voice transformations and one of the various noise levels. The at least one processor is further configured to train the ASR model to perform ASR, using the corpus audio data set.

This brief summary is provided to describe select concepts in a simplified form that are further described in the detailed description, in accordance with various embodiments that encompass the concepts described in the brief summary. This brief summary is not intended to identify key or essential features of the subject matter of the present disclosure, with reference to the claims or otherwise, nor is this brief summary intended to be used as an aid in determining the full scope of the disclosed subject matter, which is properly determined with reference to the various embodiments of the present disclosure.

BRIEF DESCRIPTION OF THE DRAWING FIGURES

A more complete understanding of the disclosure may be derived from the accompanying drawing figures, wherein like reference numerals denote like elements, and wherein.

DETAILED DESCRIPTION

Figure 1:
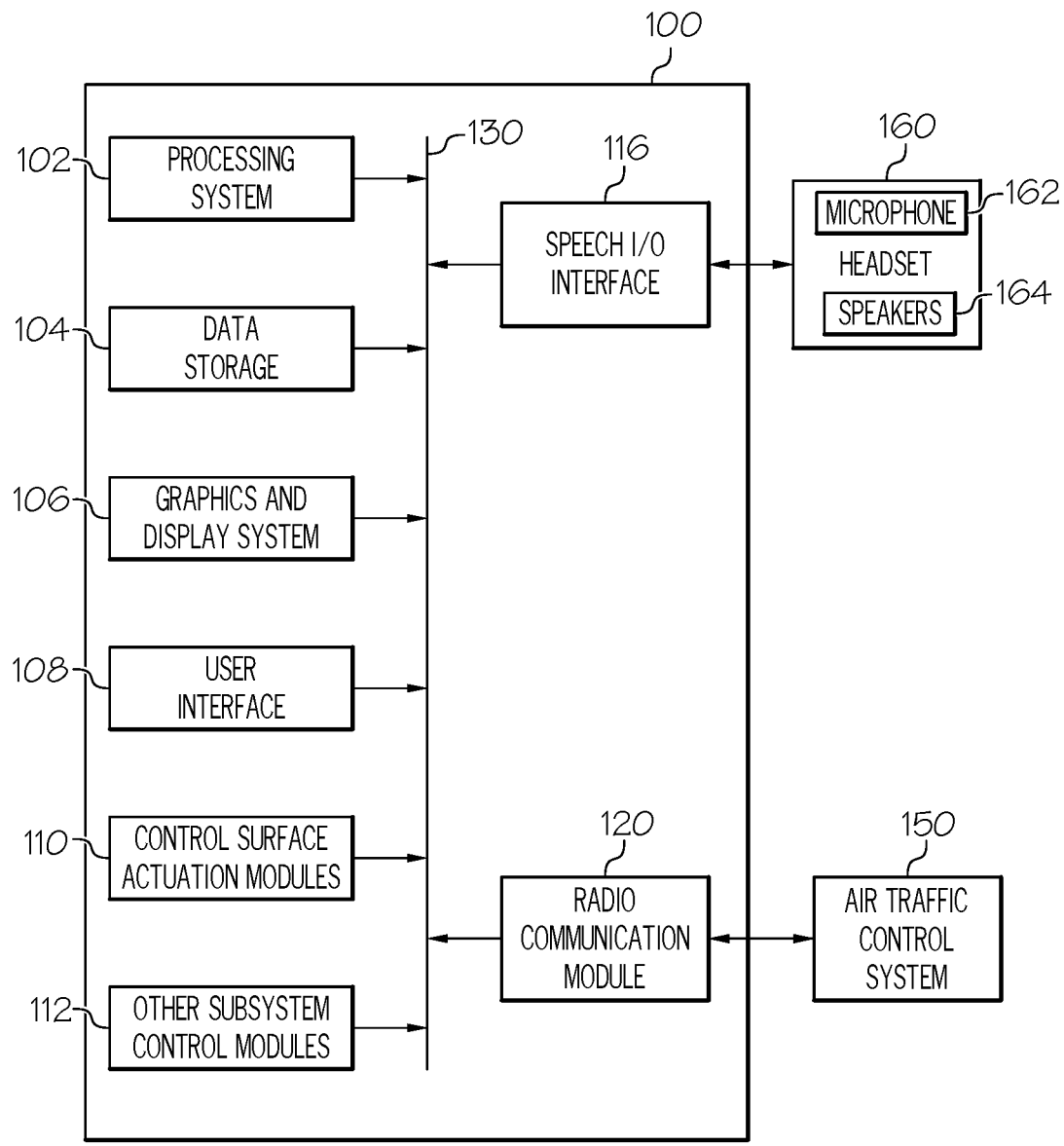
FIG. 1 is a schematic block diagram of an aircraft system with an integrated acoustic speech recognition system, in accordance with an exemplary embodiment.

The following detailed description is merely exemplary in nature and is not intended to limit the invention or the application and uses of the invention. As used herein, the word "exemplary" means "serving as an example, instance, or illustration." Thus, any acoustic speech recognition system or method embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims.

Although embodiments of the inventive subject matter that are implemented in aircraft-based speech recognition systems are described in detail below, it is to be understood that embodiments may be implemented in various other types of speech recognition systems and/or apparatus. These various types of systems and/or apparatus include, but are not limited to, systems implemented in aircraft, spacecraft, motor vehicles, water vessels, other types of vehicles and vessels, air traffic control (ATC) systems, an electronic records systems, robotic systems, hardware system control and monitoring systems (e.g., for manufacturing, energy production, mining, construction, and so on), computer system control and monitoring systems, and network control and monitoring systems, among other things. Accordingly, references herein to aircraft-based speech recognition systems are not intended to be limiting. Those of skill in the art will understand, based on the description herein, that other embodiments may be implemented in various other types of systems.

The inventive subject matter may be useful for various, diverse applications that may benefit from speech recognition in general, and voice-activated operational control that is based on speech-recognition techniques, in particular. For example, the inventive subject matter may be used in the context of voice-activated vehicular operations (e.g., aircraft, helicopter, automobile, or ship), voice-activated air traffic control operations, and voice-activated electronic documentation and/or records access processes, among other things. In the description below, an example application of voice-activated aircraft operations is described in more detail. Those of skill in the art will understand, based on the description herein, that other embodiments may be implemented to perform other types of operations.

In the context of voice-activated aircraft operations, speech processing methods and apparatus consistent with the inventive subject matter may be used to assist cockpit personnel (e.g., pilot, co-pilot, and navigator) in the performance of checklist related actions, data entry actions, data retrieval actions, and system control actions, among other things. For example, the inventive speech processing methods may be used in the performance of checklist related actions by helping to ensure that all checklist items associated with parameter checking and tasks during takeoff and landing have been appropriately completed. Data entry actions may include hands-free selection of radio frequencies/channels, setting of warning levels, specification of navigational information, and so on. Data retrieval actions may include hands-free retrieval of data (e.g., navigational, operational, and mission related data). System control actions may include hands-free control of various aircraft systems and modules, as will be described in more detail later.

In the presently-described embodiments, the speech recognition system is operationally coupled with a host system, and speech commands and information that are recognized by the speech recognition system may be conveyed to the host system in order to control operations of the host system, input data to the host system, and/or retrieve data from the host system. For example, but not by way of limitation, the host system to which the speech recognition system is coupled may be any system selected from a group consisting of a vehicular control system, an aircraft control system, a spacecraft control system, a motor vehicle control system, a water vessel control system, an air traffic control (ATC) system, an electronic records system, a robotics system, a hardware system control and monitoring system, a computer system control and monitoring system, a network control and monitoring system, a portable system used for emergency search and rescue (e.g., first responder) operations, an industrial monitoring and control system (e.g., used in the context of power plants, refineries, off-shore oil drilling stations, and so on), and various other types of systems.

In the presently-described embodiments, the ASR system is a speaker-dependent speech recognition system. More particularly, a speaker-dependent speech recognition system implements a training process for a system user, during which user utterances (e.g., speech) are input to the system, digitized, and analyzed to develop a voice profile that may be used during future interactive sessions to increase the accuracy of speech recognition. Such speech recognition systems store the voice profile in the system itself. In the aircraft context, for example, a pilot in a cockpit of a first aircraft may interact with a cockpit-based speech recognition system to perform a training process, and the voice profile generated during the training process is stored in the speech recognition system and may be used during future operations of that aircraft. However, when the pilot enters the cockpit of a second aircraft, the pilot must undergo another training process to generate a voice profile to be stored in the speech recognition system of the second aircraft, using prior techniques. For this reason, embodiments of the present disclosure operate with a relatively small amount of voice corpus data such that the training process is relatively compact and does not significantly impact other aircraft operations in terms of time required of the flight crew. Various embodiments will now be described in more detail in conjunction with FIGS. 1-6.

FIG. 1 is a schematic block diagram of an aircraft system 100 with an integrated acoustic speech recognition system, in accordance with an exemplary embodiment. The illustrated embodiment of the aircraft system 100 includes, without limitation: at least one processing system 102; an appropriate amount of data storage 104; a graphics and display system 106; a user interface 108; control surface actuation modules 110; other subsystem control modules 112; a speech input/output (I/O) interface 116; and a radio communication module 120. These elements of the aircraft system 100 may be coupled together by a suitable interconnection architecture 130 that accommodates data communication, the transmission of control or command signals, and/or the delivery of operating power within the aircraft system 100. It should be understood that FIG. 1 is a simplified representation of the aircraft system 100 that will be used for purposes of explanation and ease of description, and that FIG. 1 is not intended to limit the application or scope of the subject matter in any way. In practice, the aircraft system 100 and the host aircraft will include other devices and components for providing additional functions and features, as will be appreciated in the art. Furthermore, although FIG. 1 depicts the aircraft system 100 as a single unit, the individual elements and components of the aircraft system 100 could be implemented in a distributed manner using any number of physically distinct pieces of hardware or equipment.

The processing system 102 may be implemented or realized with one or more general purpose processors, content addressable memory, digital signal processors, application specific integrated circuits, field programmable gate arrays, any suitable programmable logic devices, discrete gate or transistor logic, discrete hardware components, or any combination designed to perform the functions described here. A processor device may be realized as a microprocessor, a controller, a microcontroller, or a state machine. Moreover, a processor device may be implemented as a combination of computing devices (e.g., a combination of a digital signal processor and a microprocessor, a plurality of microprocessors, one or more microprocessors in conjunction with a digital signal processor core, or any other such configuration). As described in more detail below, the processing system 102 may implement a speech recognition algorithm and, when operating in that context, may be considered a speech recognition system. In addition, the processing system 102 may generate commands, which may be communicated through interconnection architecture 130 to various other system components. Such commands may cause the various system components to alter their operations, provide information to the processing system 102, or perform other actions, non-limiting examples of which will be provided below.

The data storage 104 may be realized as RAM memory, flash memory, EPROM memory, EEPROM memory, registers, a hard disk, a removable disk, a CD-ROM, or any other form of storage medium known in the art. In this regard, the data storage 104 can be coupled to the processing system 102 such that the processing system 102 can read information from, and write information to, the data storage 104. In the alternative, the data storage 104 may be integral to the processing system 102. As an example, the processing system 102 and the data storage 104 may reside in an ASIC. In practice, a functional or logical module/component of the aircraft system 100 might be realized using program code that is maintained in the data storage 104. For example, the processing system 102, the graphics and display system 106, the control modules 110, 112, the speech I/O interface 116, and/or the radio communication module 120 may have associated software program components that are stored in the data storage 104. Moreover, the data storage 104 can be used to store data (e.g., voice training data) utilized to support the implementation of speech recognition and the operation of the aircraft system 100, as will become apparent from the following description.

The graphics and display system 106 includes one or more displays and associated graphics processors. Processing system 102 and graphics and display system 106 cooperate to display, render, or otherwise convey one or more graphical representations, synthetic displays, graphical icons, visual symbology, or images associated with operation of the host aircraft. An embodiment of the aircraft system 100 may utilize existing graphics processing techniques and technologies in conjunction with the graphics and display system 106. For example, graphics and display system 106 may be suitably configured to support well known graphics technologies such as, without limitation, VGA, SVGA, UVGA, or the like.

User interface 108 is suitably configured to receive input from a user (e.g., a pilot) and, in response to the user input, to supply appropriate command signals to the processing system 102. The user interface 108 may include any one, or any combination, of various known user interface devices or technologies, including, but not limited to: a cursor control device such as a mouse, a trackball, or joystick; a keyboard; buttons; switches; knobs; levers; or dials. Moreover, the user interface 108 may cooperate with the graphics and display system 106 to provide a graphical user interface. Thus, a user can manipulate the user interface 108 by moving a cursor symbol rendered on a display, and the user may use a keyboard to, among other things, input textual data. For example, the user could manipulate the user interface 108 to initiate or influence execution of the speech recognition application by the processing system 102, and the like.

In an exemplary embodiment, the radio communication module 120 is suitably configured to support data communication between the host aircraft and one or more remote systems. For example, the radio communication module 120 may be designed and configured to enable the host aircraft to communicate with an air traffic control (ATC) system 150. In this regard, the radio communication module 120 may include or support a datalink subsystem that can be used to provide ATC data to the host aircraft and/or to send information from the host aircraft to the ATC system 150, preferably in compliance with known standards and specifications. In certain implementations, the radio communication module 120 is also used to communicate with other aircraft that are near the host aircraft. For example, the radio communication module 120 may be configured for compatibility with Automatic Dependent Surveillance-Broadcast (ADS-B) technology, with Traffic and Collision Avoidance System (TCAS) technology, and/or with similar technologies.

Control surface actuation modules 110 include electrical and mechanical systems configured to control the orientation of various flight control surfaces (e.g., ailerons, wing flaps, rudder, and so on). Processing system 102 and control surface actuation modules 110 cooperate to adjust the orientation of the flight control surfaces in order to affect the attitude and flight characteristics of the host aircraft. Processing system 102 also may cooperate with other subsystem control modules 112 to affect various aspects of aircraft operations. For example, but not by way of limitation, the other subsystem control modules 112 may include, but are not limited to, a landing gear actuation module, a cabin environment control system, a throttle control system, a propulsion system, a radar system, and a data entry system.

Speech I/O interface 116 is suitably configured to couple headset 160 with the system 100, which enables system 100 to communicate with a system user (e.g., a pilot) through speech. For example, when the system user produces an utterance that is captured as an analog signal by a microphone 162, speech I/O interface 116 digitizes the analog speech signal and provides the digital speech signal to processing system 102 for analysis by a speech recognition algorithm. In addition, processing system 102 and other system components (e.g., radio communication module 120) may provide digital speech signals to speech I/O interface 116, which may generate analog speech signals from the digital speech signals and provide the analog speech signal to one or more speakers 164 of the headset 160.

Figure 2:
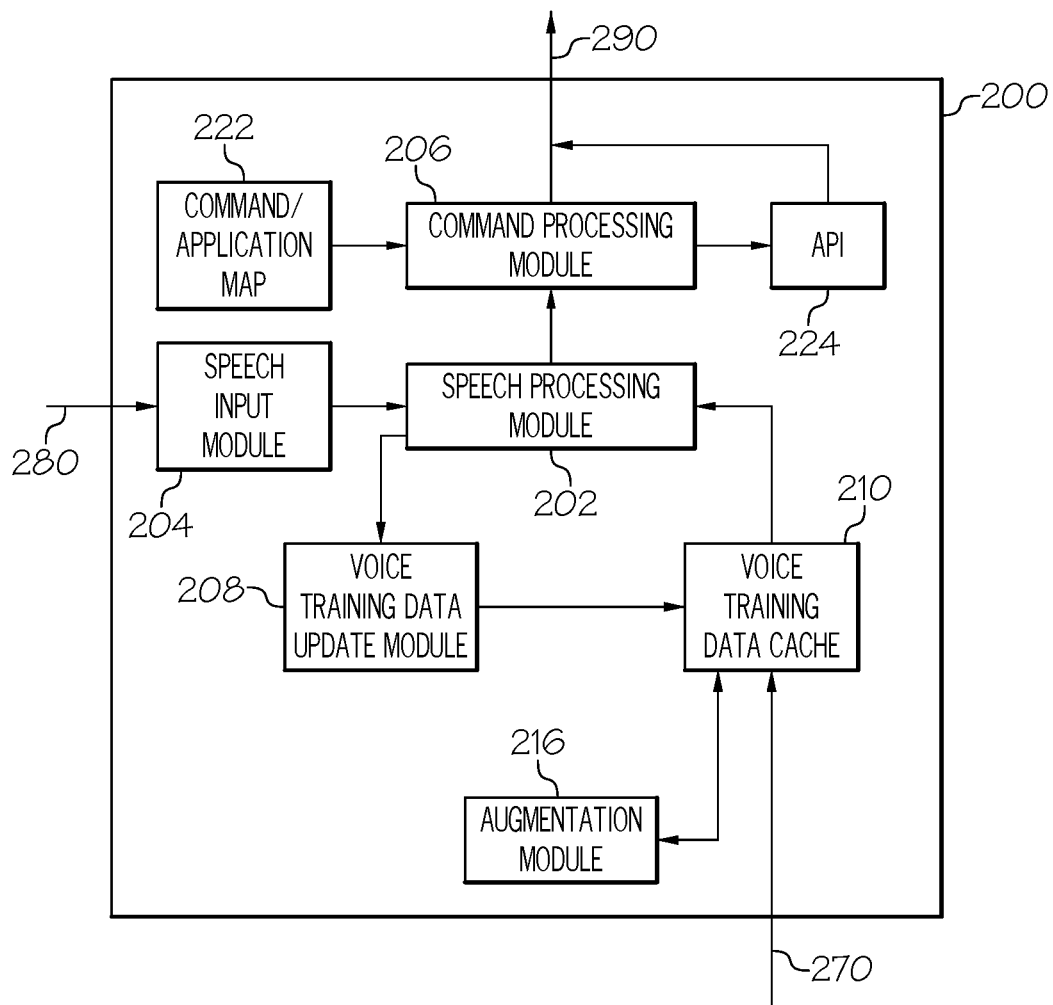
FIG. 2 is a functional block diagram of an acoustic speech recognition system, in accordance with an exemplary embodiment.

FIG. 2 is a functional block diagram of an acoustic speech recognition system 200, in accordance with an exemplary embodiment. The illustrated embodiment of the speech recognition system 200 includes, without limitation: a speech processing module 202; a speech input module 204; a command processing module 206; a voice training data update module 208; a voice training data cache 210; and an augmentation module 216. A processing system (e.g., processing system 102, FIG. 1) of the aircraft system may implement speech processing module 202, speech input module 204 (in conjunction with speech I/O interface 116, FIG. 1), command processing module 206, and voice training data update module 208 by executing program code associated with these various functionalities. In addition, the voice training data cache 210 may be implemented as data storage that is closely coupled with the processing system, or as separate data storage (e.g., data storage 104, FIG. 1) of the system.

Initially, voice corpus data 270 is provided to voice training data cache of system 200 during a training process. The training process generates and stores initial voice training data (e.g., one or more initial voice profiles) for an individual (e.g., a pilot or other system user). The initial voice training data may be generated by an in-cockpit speech recognition system, or by a separate training system configured to produce initial voice training data. The training system may be configured to produce different voice profiles for different ambient noise conditions (e.g., a quiet environment, a low engine noise environment, and/or a high engine noise environment), according to an embodiment. As such, system 200 uses the training process to obtain a plurality of voice data articulations of predetermined phrases. These audio samples include actual articulated voice data (i.e., just the data that defines the spoken words) as well as other acoustic frequency components that are present in the ambient environment, as initially noted above.

Speech processing module 202 executes a speech recognition algorithm that uses voice corpus data that is stored in the voice training data cache to identify one or more recognized terms from a digital speech signal 280. The digital speech signal 280 is generated (e.g., by microphone 162 and speech I/O interface 116, FIG. 1) in response to utterances made by the system user, and speech input module 204 is configured to receive and convey the speech signal 280 to speech processing module 202. In an embodiment, speech input module 204 may cache the received speech data within speech signal 280 for later consumption by speech processing module 202.

Speech processing module 202 may execute any type of speech recognition algorithm that uses voice corpus data (i.e., training data) in conjunction with speech recognition. For example, but not by way of limitation, speech processing module 202 may execute a speech recognition algorithm that utilizes Hidden Markov Models (HMMs) for modeling and recognizing patterns from sequential speech data, and which use voice training data (e.g., voice profile data) to train the system. HMMs are statistical models, which output a sequence of symbols or quantities. For example, an HMM periodically may output a sequence of n-dimensional, real valued vectors (e.g., cepstral coefficients). Each word (or phoneme) has a different output distribution, and an HMM for a sequence of words or phonemes can be made by concatenating the individual trained HMMs for separate words and phonemes. When the speech recognition algorithm is presented with a new utterance, speech decoding may use the Viterbi algorithm to find a best path. Alternatively, the speech recognition algorithm may use dynamic time warping, artificial neural network technology and Bayesian networks, or other speech recognition techniques. The present disclosure should not be viewed as limited by any particular speech recognition algorithm.

According to an embodiment, the speech recognition algorithm produces recognized terms from a known set of vocabulary terms, which are typical of the application (e.g., controlling an aircraft), and which also are known to system users. The known vocabulary terms may include terms associated with typical commands that may be uttered by a system user (e.g., "change radio frequency to 127.7 megahertz," "lower flaps to 15 degrees," and so on). Speech processing module 202 communicates the recognized vocabulary terms to command processing module 206, which is configured to determine a system response based on commands formed from the recognized terms, and to generate control signals 290 to cause the aircraft system to implement the system response. In various embodiments, the command processing module 206 is configured to generate control signals 290 to affect the operation of one or more aircraft subsystems selected from a group of subsystems consisting of a radio communication module (e.g., module 120, FIG. 1), a graphics and display system (e.g., system 106, FIG. 1), a control surface actuation module (e.g., module 110, FIG. 1), a landing gear actuation module, a cabin environment control system, a throttle control system, a propulsion system, a radar system, a data entry system, and other types of aircraft subsystems.

According to an embodiment, command processing module 206 implements appropriate system responses (i.e., generates appropriate control signals 290) by executing applications associated with various known commands. More particularly, command processing module 206 may map a recognized voice command received from the speech processing module 202 to a particular application action (e.g., actions such as storing data, retrieving data, or controlling a component of the aircraft, among other things) using command/application mapping data 222. Command processing module 206 also may communicate information regarding the action to an application programming interface (API) 224 associated with a host system component configured to perform the action.

For example, for a recognized command relating to cockpit operations, command processing module 206 may map the command to a cockpit operations application action and may communicate information regarding the action to API 224, which may thereafter initiate an appropriate cockpit operations application, which is configured to initiate from 1 to N different types of actions associated with cockpit operations. Recognized commands relating to cockpit operations may include, for example but not by way of limitation: i) checklist related commands (e.g., commands associated with ensuring that all parameter checking and tasks associated with take-off/landing checklists have been completed); ii) data entry related commands (e.g., commands for setting radio frequencies, selecting channels, setting warning levels (e.g., low fuel, and so on), and other commands); iii) commands associated with controlling multi-function displays (e.g., radar displays, jammer displays, and so on); and iv) data retrieval related commands (e.g., retrieving data associated with the mission, speed, altitude, attitude, location, direction of flight, angle of approach for landing, external atmospheric conditions, cabin conditions, fuel status, and rates of change of various parameters). Some of the cockpit operations application actions that are mapped to the commands (and executed) may include providing human perceptible information (e.g., data) via a display system and/or audio system. A response generator associated with the cockpit operations application may generate and provide a response signal to display and/or audio components of a user interface (e.g., graphics and display system 106 and/or speech I/O interface 116, FIG. 1). The user interface may interpret the response signal and appropriately control the display and/or audio components to generate human perceptible information (e.g., displayed information or audibly output information) corresponding to the interpreted response signal.

As another example, for a recognized command of "change radio frequency to 127.7 megahertz", command processing module 206 may map the command to a radio control application action and may communicate information regarding the action to API 224, which may thereafter initiate an appropriate radio control application. Execution of the radio control application may result in the production of a response signal destined for the radio communication module (e.g., radio communication module 120, FIG. 1), which causes the radio communication module to switch frequencies to 127.7 megahertz. Similarly, command processing module 206 may initiate the execution of applications that cause the graphics and display system (e.g., system 106, FIG. 1) to alter displayed information, applications that cause control surface actuation modules (e.g., modules 110, FIG. 1) to change the configuration of one or more flight control surfaces, and/or actions that cause other subsystem control modules to change their operation (e.g., lower/raise landing gear, change cabin pressure or temperature, contact flight attendants, and so on).

According to an embodiment, voice training data update module 208 is configured to generate updated voice training data and metadata based on the digital speech signal 280, and to provide the updated voice training data and metadata to the voice training data cache 210. In an embodiment, updated voice training data is generated and provided when a current speech sample (e.g., a speech sample obtained from the user after initiation of the system) has an insufficient correlation with voice profiles previously acquired. More specifically, the voice training data update module 208 may enter an update mode and generate a new voice profile that reflects new voice training data. The voice training data update module 208 then automatically updates the voice training information in the voice training data cache 210. Accordingly, the voice training data update module 208 has the ability to train and add voice profiles into the existing set of profiles for the user. The voice training data update module 208 may use any of a variety of standard learning machines or learning systems concepts (e.g., Neural Network based training procedures) in order to provide the ability to produce updated voice training data.

According to an embodiment, the acoustic speech recognition system 200 of the present disclosure also includes augmentation module 216. The augmentation module 216 interfaces with voice training data cache and augments the voice corpus data included therein. Accordingly, the augmentation module provides system functionality with regard to using a relatively small amount of voice corpus data to allow the speech processing module to accurately identify spoken words (signal 280).

Figure 3:
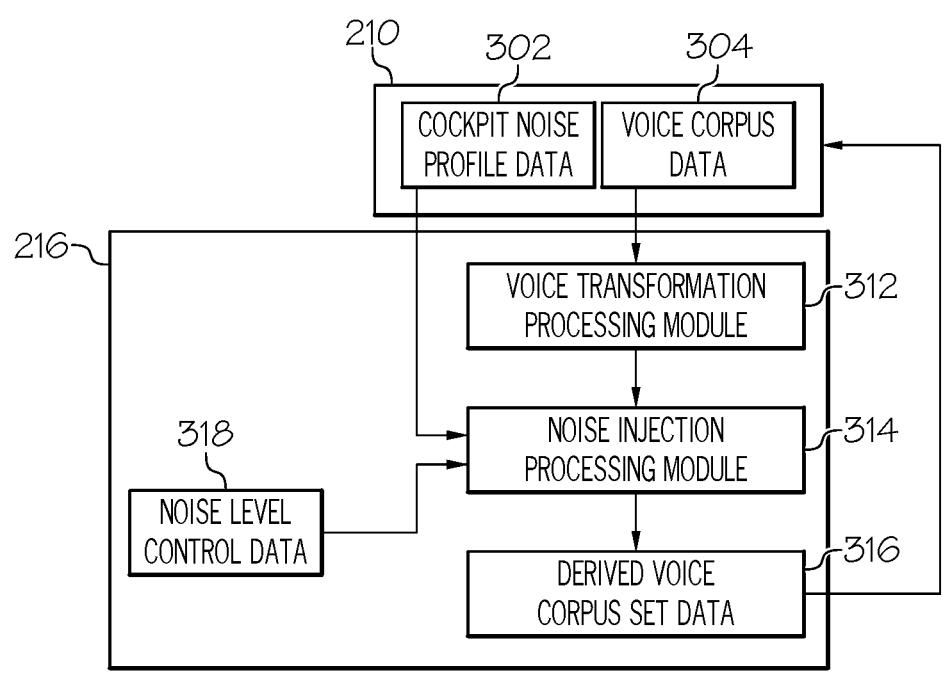
FIG. 3 is a system diagram illustrating the design and operation of an augmentation module of the acoustic speech recognition system of FIG. 2, in accordance with an exemplary embodiment.

FIG. 3 is a system diagram that provides greater detail regarding the design and operation of the augmentation module 216. As previously noted, the initial voice training data stored in the voice training data cache 210 includes one or more audio samples that include actual articulated voice data (i.e., just the data that defines the spoken words; voice corpus data 304) as well as other acoustic frequency components that are present in the ambient environment (cockpit noise profile data 302). The augmentation module 216 processes each of these data 302, 304 in a different manner (at modules 312 and 314 respectively, as will be described in greater detail below), and then recombines them in various combinations to generate augmented (derived) voice corpus set data 316.

Figure 4:
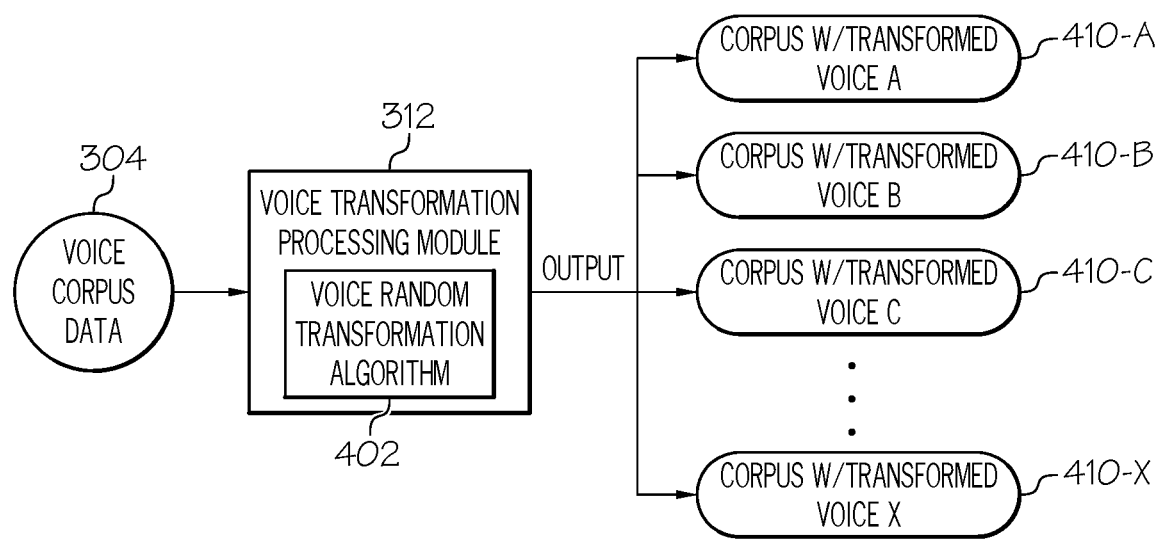
FIG. 4 is a system diagram illustrating the design and operation of a voice transformation processing module of the augmentation module of FIG. 3, in accordance with an exemplary embodiment.

Within augmentation module 216 (FIGS. 2 and 3), and with further reference to FIG. 4, the initial training voice corpus data 304 is provided to the voice transformation processing module 312, which performs a "voice random" transformation algorithm 402. Algorithm 402 is referred to as a "voice random" algorithm because for each instance of a given frequency component (i.e., range) in the voice data articulations, a random determination is made as to whether such frequency component will be transformed (via enhancement or suppression). Thus, for a frequency component that is to be enhanced, some of the instances of that frequency component in the voice articulations will be enhanced and some will not be, at random. Likewise, for a frequency component that is to be suppressed, some of the instances of that frequency component in the voice articulations will be suppressed and some will not be, at random. Whether a frequency component is one that is to be enhanced or suppressed is a predetermined aspect of the algorithm, and may vary from embodiment to embodiment. When a voice articulation has the voice random transformation applied to it by module 312, the voice articulation sounds like a different speaker (i.e., it does not sound like the speaker who made the articulation). Thus, the output of the module 312 is voice corpus data that includes the voice data articulations as if they had been spoken by a plurality of different speakers, illustrated in FIG. 4 as corpus with transformed voices A through X (410-A, 410-B, 410-C, . . . 410-X). As such, voice transformation processing module 312 performs a first level of augmentation by processing each of the voice data articulations in data 304 to enhance a first subset of the acoustic frequency components and to suppress a second subset of the acoustic frequency components, thereby generating transformed voice data articulations that include a plurality of voice transformations.

Figure 5:
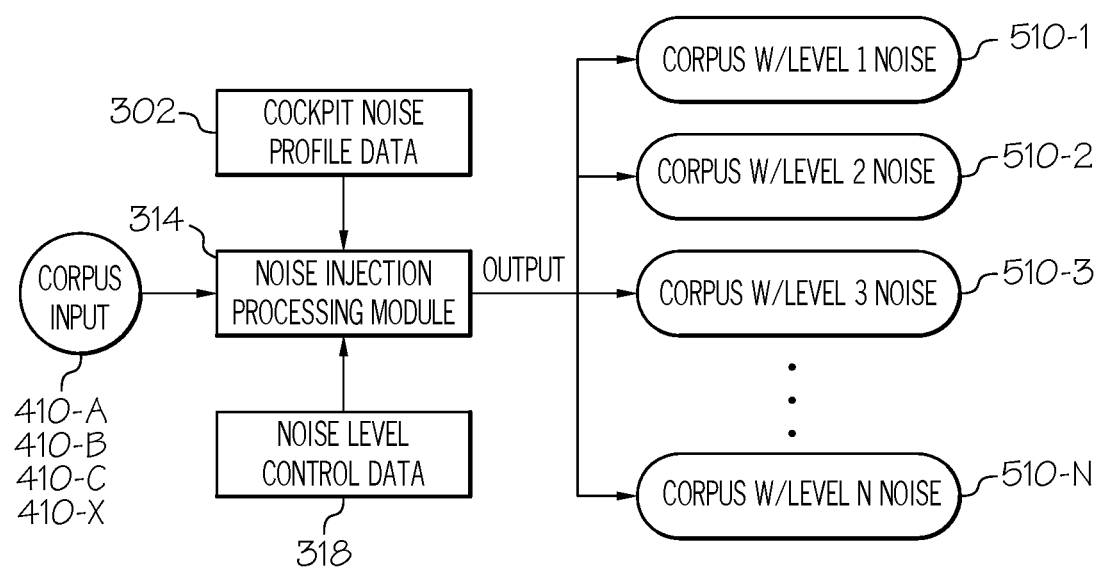
FIG. 5 is a system diagram illustrating the design and operation of a noise injection processing module of the augmentation module of FIG. 3, in accordance with an exemplary embodiment.

Further within augmentation module 216 (FIGS. 2 and 3), and further with reference to FIG. 5, the voice transformations 410-A through 410-X are provided to noise injection processing module 314. The noise injection processing module 314 also receives the previously-described cockpit noise profile data 302 from the cache 210, as well as noise level control data 318. Noise level control data 318 are predetermined factors by which the noise level (i.e., decibel level) of the cockpit noise profile data 302 is to be adjusted (such as reduced), and may vary from embodiment to embodiment. As such, at module 314, the cockpit noise profile data 302 is received and adjusted by the various factors as determined by noise level control data 318, and then each such adjusted cockpit noise profile data is combined with each of the voice transformations 410-A through 410-X to generate corpus data with "level 1" noise (510-1), corpus data with "level 2" noise (510-2), corpus data with "level 3" noise (510-3), through corpus data with "level N" noise (510-N). As such, noise injection processing module 314 performs a second level of augmentation by processing the transformed voice data articulations (FIG. 4; 410-A through 410-X) by combining the transformed voice data articulations 410-A through 410-X with noise-based audio data, to generate combined voice data articulations (corpus data 510-1 through 510-N), wherein the levels of the noise-based cockpit profile audio data for each of the combined voice data articulations has been adjusted to generate a corpus audio data set including various cockpit noise levels.

Figure 6:
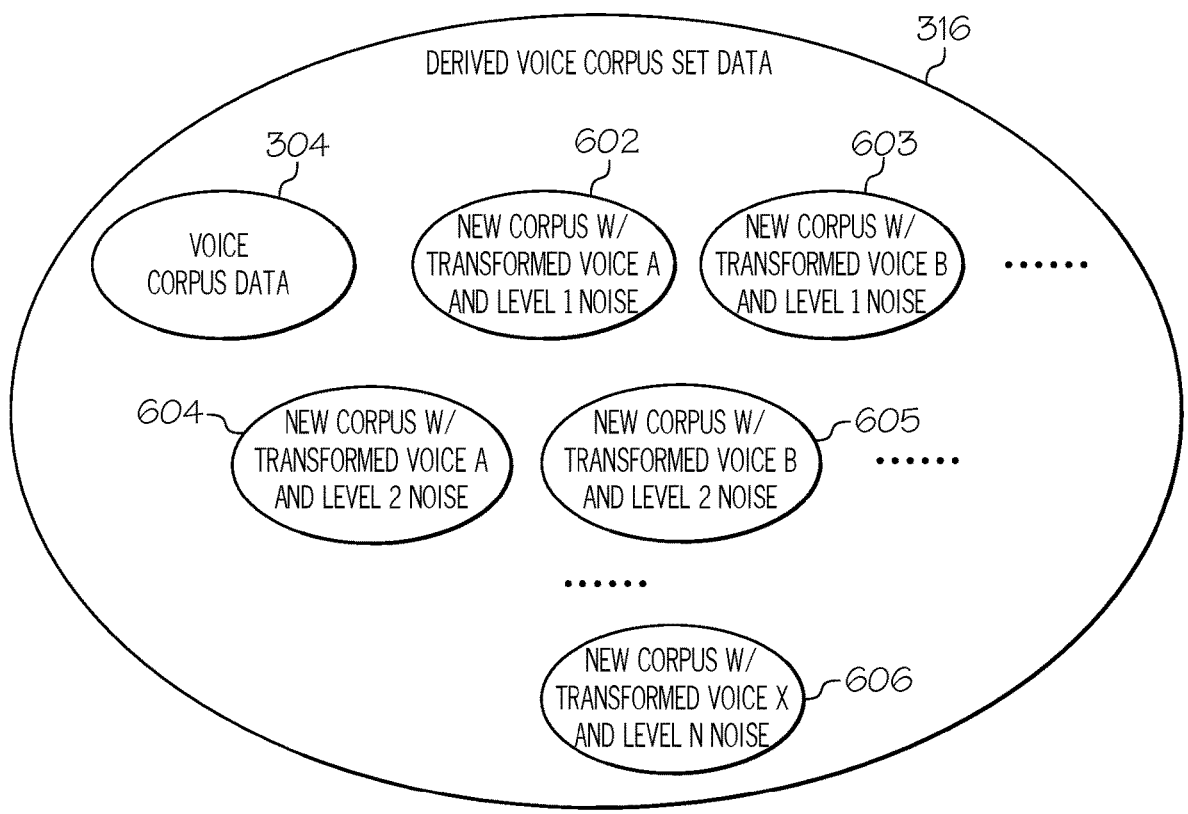
FIG. 6 is a representation of a derived voice corpus data set generated by the augmentation module of FIG. 3, in accordance with an exemplary embodiment.

At processing module 314, each voice transformation 410-A through 410-X is combined with each cockpit noise level (from control data 318), and as such an augmented (derived) voice corpus data set 316 is generated with X by N augmented voice articulations. This data set 316 is represented in FIG. 6, with articulations 602 and 603 representing "level 1" noise with "voices" A and B, respectively, articulations 604 and 605 representing "level 2" noise with "voices" A and B, respectively, and an articulation 606 representing "level X" noise with "voice" N. Corpus data set 316 may thus be provided to and stored in the cache 210, as shown in FIG. 3. The speech processing module 202 may utilize this augmented data set 316, which includes X by N additional voice articulation entries for each original voice articulation, when performing its speech recognition function, as described above. With all of these additional (system-generated) reference points of the pre-defined training articulations, it is expected that the accuracy in voice recognition performed at module 202 will be relatively greater than if the module 202 only had the original (speaker-generated) articulations to reference. As such, the amount of time required by the flight crew to generate additional articulations is avoided, while still maintaining an acceptable level of accuracy in voice recognition.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for initializing a device for performing acoustic speech recognition (ASR) using an ASR model, by a computer system comprising at least one processor and a system memory element, the method comprising:

obtaining a plurality of voice data articulations of predetermined phrases, by the at least one processor via a user interface, wherein the plurality of voice data articulations comprises a first quantity of audio samples of actual articulated voice data, and wherein each of the plurality of voice data articulations comprises one of the audio samples including acoustic frequency components;

performing a plurality of augmentations to the plurality of voice data articulations of predetermined phrases, to generate a corpus audio data set that includes the first quantity of audio samples and a second quantity of audio samples comprising augmented versions of the first quantity of audio samples, by:

performing a first level augmentation by processing each of the plurality of voice data articulations to enhance a first subset of the acoustic frequency components and to suppress a second subset of the acoustic frequency components, to generate transformed voice data articulations including a plurality of voice transformations; and performing a second level augmentation by processing the transformed voice data articulations, by:

combining the transformed voice data articulations with noise-based audio data, to generate combined voice data articulations, by the at least one processor; and adjusting levels of the noise-based audio data for each of the combined voice data articulations to generate the corpus audio data set including various noise levels, by the at least one processor, wherein each audio sample of the corpus audio data set includes one of the plurality of voice transformations and one of the various noise levels; and training the ASR model to perform ASR, using the corpus audio data set, by the at least one processor.

2. The method of claim 1, wherein the device is implemented in an aircraft, and wherein obtaining the plurality of voice articulations is performed using a headset comprising a microphone and a speaker that is communicatively coupled with the aircraft.

3. The method of claim 1, wherein performing the first level augmentation comprises utilizing a voice random transformation algorithm that selects the first and second subsets at random.

4. The method of claim 1, wherein the first subset of the acoustic frequency components comprises frequency components of the same frequency range.

5. The method of claim 1, wherein the second subset of the acoustic frequency components comprises frequency components of the same frequency range.

6. The method of claim 1, wherein the device is implemented in an aircraft, and wherein adjusting the noise-based audio data comprises adjusting cockpit noise profile data.

7. The method of claim 1, wherein the device is implemented in an aircraft, and wherein the method further comprises receiving a flight crew or air traffic control voice communication and automatically recognizing words spoken in the voice communication using the ASR model.

8. The method of claim 7, further comprising automatically performing an aircraft function based on the recognized words spoken.

9. The method of claim 1, further comprising generating an updated ASR model using a further plurality of voice data articulations of the predetermined phrases subsequently received via the user interface.

10. The method of claim 1, further comprising initiating an upload of the ASR model into the device for performing the ASR, by the at least one processor.

11. A computer system for performing acoustic speech recognition (ASR) using an ASR model, comprising:
a system memory element;
a user interface; and
at least one processor, wherein the at least one processor is configured to:
obtain a plurality of voice data articulations of predetermined phrases via the user interface, wherein the plurality of voice data articulations comprises a first quantity of audio samples of actual articulated voice data, and wherein each of the plurality of voice data articulations comprises one of the audio samples including acoustic frequency components;

perform a plurality of augmentations to the plurality of voice data articulations of predetermined phrases, to generate a corpus audio data set that includes the first quantity of audio samples and a second quantity of audio samples comprising augmented versions of the first quantity of audio samples, by:

performing a first level augmentation by processing each of the plurality of voice data articulations to enhance a first subset of the acoustic frequency components and to suppress a second subset of the acoustic frequency components, to generate transformed voice data articulations including a plurality of voice transformations; and performing a second level augmentation by processing the transformed voice data articulations, by:

combining the transformed voice data articulations with noise-based audio data, to generate combined voice data articulations; and adjusting levels of the noise-based audio data for each of the combined voice data articulations to generate the corpus audio data set including various noise levels, wherein each audio sample of the corpus audio data set includes one of the plurality of voice transformations and one of the various noise levels; and train the ASR model to perform ASR, using the corpus audio data set.

12. The computer system of claim 11, wherein the computer system in an aircraft, and wherein the at least one processor is configured to obtain the plurality of voice articulations via electronic communication with a headset comprising a microphone and a speaker that is communicatively coupled with the aircraft.

13. The computer system of claim 11, wherein the at least one computer processor is configured to perform the first level augmentation comprises utilizing a voice random transformation algorithm that selects the first and second subsets at random.

14. The computer system of claim 11, wherein the first subset of the acoustic frequency components comprises frequency components of the same frequency range.

15. The computer system of claim 11, wherein the second subset of the acoustic frequency components comprises frequency components of the same frequency range.

16. The computer system of claim 11, wherein the computer system is implemented in an aircraft, and wherein the at least one processor is configured to adjust cockpit noise profile data.

17. The computer system of claim 11, wherein the computer system is implemented in an aircraft, and wherein the at least one processor is further configured to receive a flight crew or air traffic control voice communication and automatically recognize words spoken in the voice communication using the ASR model.

18. The computer system of claim 17, wherein the at least one processor is further configured to command automatically performing an aircraft function based on the recognized words spoken.

19. The computer system of claim 11, wherein the at least one processor is further configured to generate an updated ASR model using a further plurality of voice data articulations of the predetermined phrases subsequently received via the user interface.

20. An aircraft comprising the computer system of claim 11.

* * * * *